United States Patent
Shen

(10) Patent No.: US 9,116,073 B2
(45) Date of Patent: *Aug. 25, 2015

(54) LENS MODULE TESTING METHOD

(71) Applicant: HON HAI PRECISION INDUSTRY CO., LTD., New Taipei (TW)

(72) Inventor: Hung-Tsan Shen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 41 days.

This patent is subject to a terminal disclaimer.

(21) Appl. No.: 14/065,441

(22) Filed: Oct. 29, 2013

(65) Prior Publication Data

US 2015/0062567 A1    Mar. 5, 2015

(30) Foreign Application Priority Data

Aug. 27, 2013  (TW) .................................. 102130598

(51) Int. Cl.
*G01M 11/00* (2006.01)
*G01M 11/02* (2006.01)

(52) U.S. Cl.
CPC .................................. *G01M 11/0292* (2013.01)

(58) Field of Classification Search
None
See application file for complete search history.

(56) References Cited

U.S. PATENT DOCUMENTS 5,717,781 A * 2/1998 Ebel et al. ..................... 382/141

* cited by examiner

*Primary Examiner* — Michael A Lyons
*Assistant Examiner* — Amanda Merlino
(74) *Attorney, Agent, or Firm* — Novak Druce Connolly Bove + Quigg LLP

(57) ABSTRACT

A lens module testing method includes the following steps: providing a lens module having a lens and a barrel; determining whether a modulation transfer function value of the lens is in a predetermined range; if not, separating the lens and the barrel, and forming a first coating layer and a second coating layer on the lens to obtain a coated lens having a number of dots; capturing a first image of the coated lens; placing the coated lens in the barrel to obtain the lens module, and capturing a second image of the coated lens; randomly choosing one dot from the dots, and determining an actual moving distance of the chosen dot using a 3D-Digital Image Correlation according to the first image and the second image; adjusting a size of the lens according to the actual moving distance; and displaying the adjusted size of the lens to a user.

7 Claims, 3 Drawing Sheets

LENS MODULE TESTING METHOD

BACKGROUND

1. Technical Field

The present disclosure relates to a lens module testing method.

2. Description of Related Art

A lens module includes a barrel and a lens assembled to the barrel. During a manufacturing process of the lens module, a fit relationship between the lens and the barrel influences a modulation transfer function (MTF) value of the lens module, which further influences an image quality of the lens. Users can decide the lens is loose fit with the barrel by observing whether the lens is easily separated form the barrel. However, it is difficult for the users to decide whether the lens is interferingly fit with the barrel.

Therefore, it is desirable to provide a lens module testing method that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
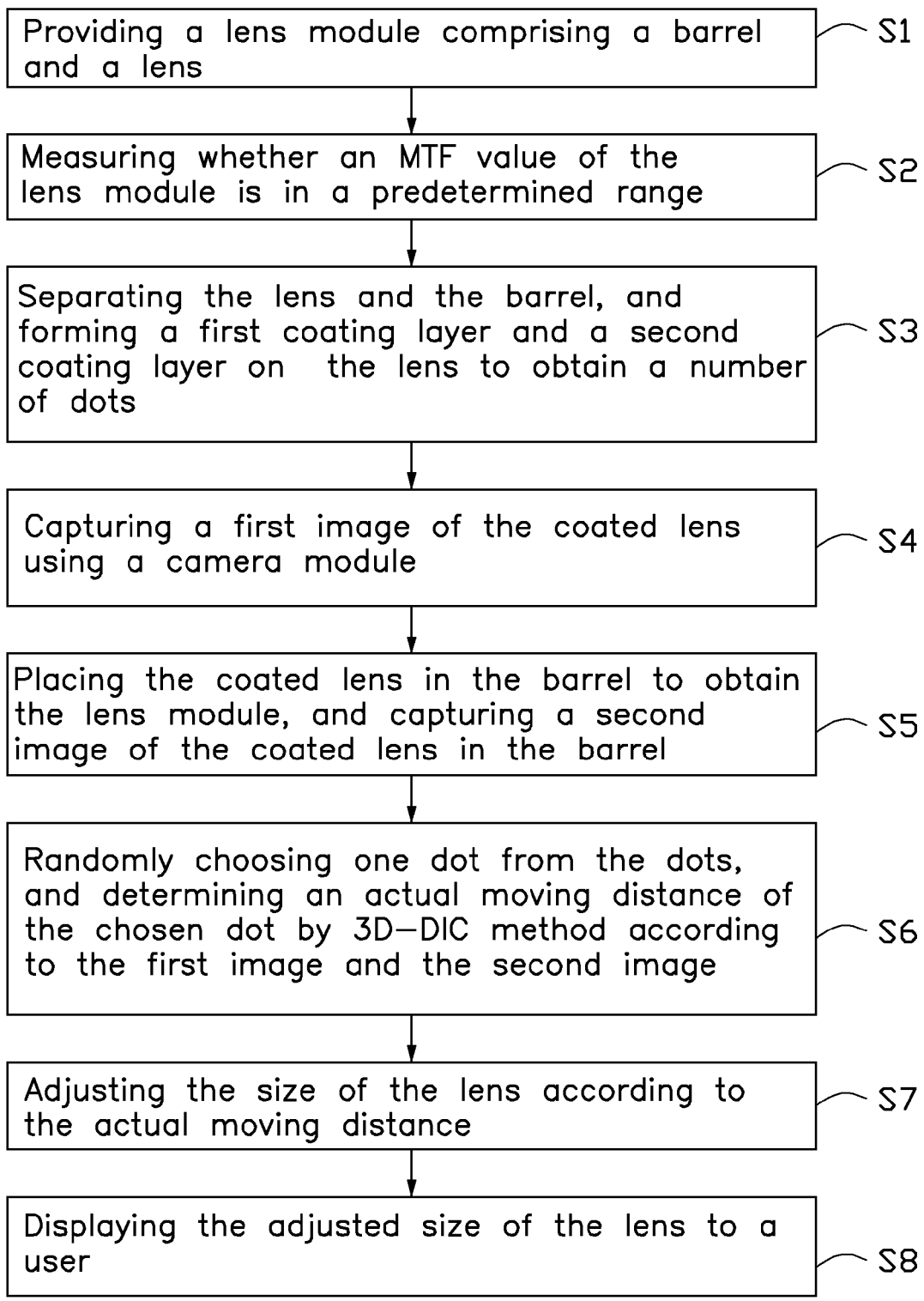
FIGS. 1-2 are flowcharts of a lens module testing method, according to an exemplary embodiment.
Figure 2:
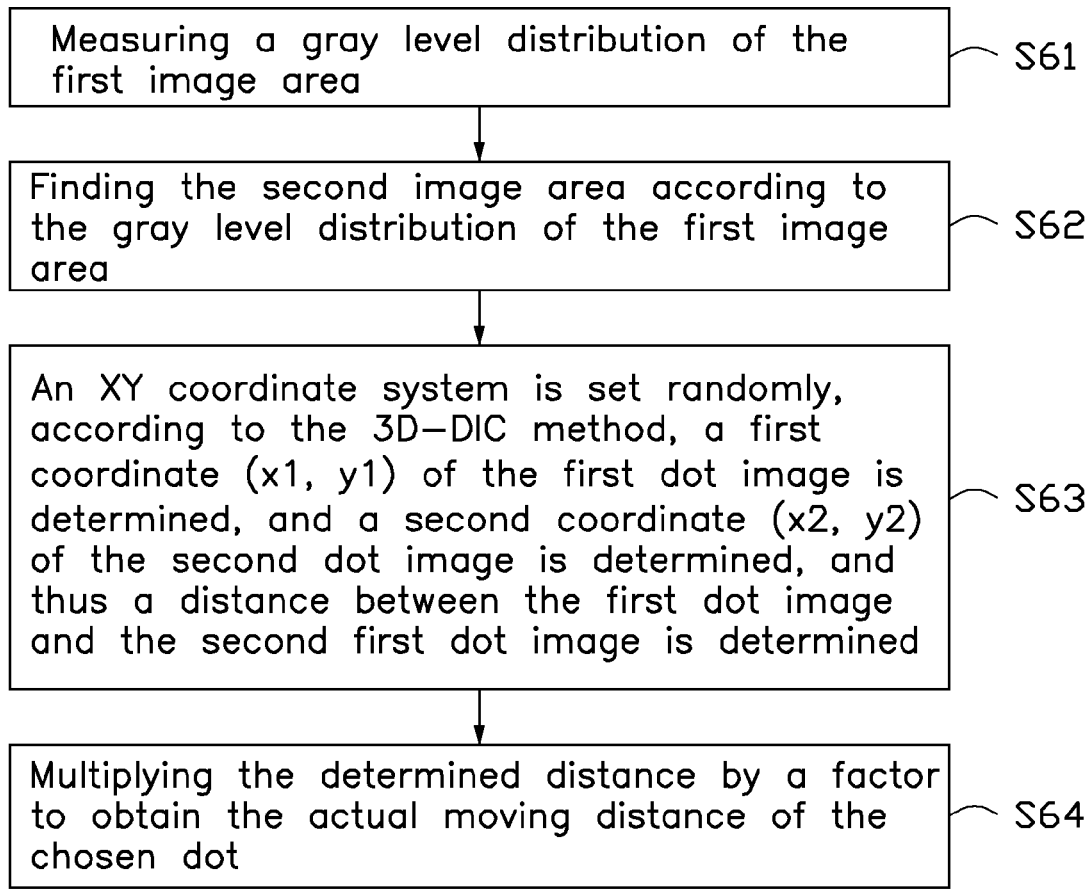
Figure 3:
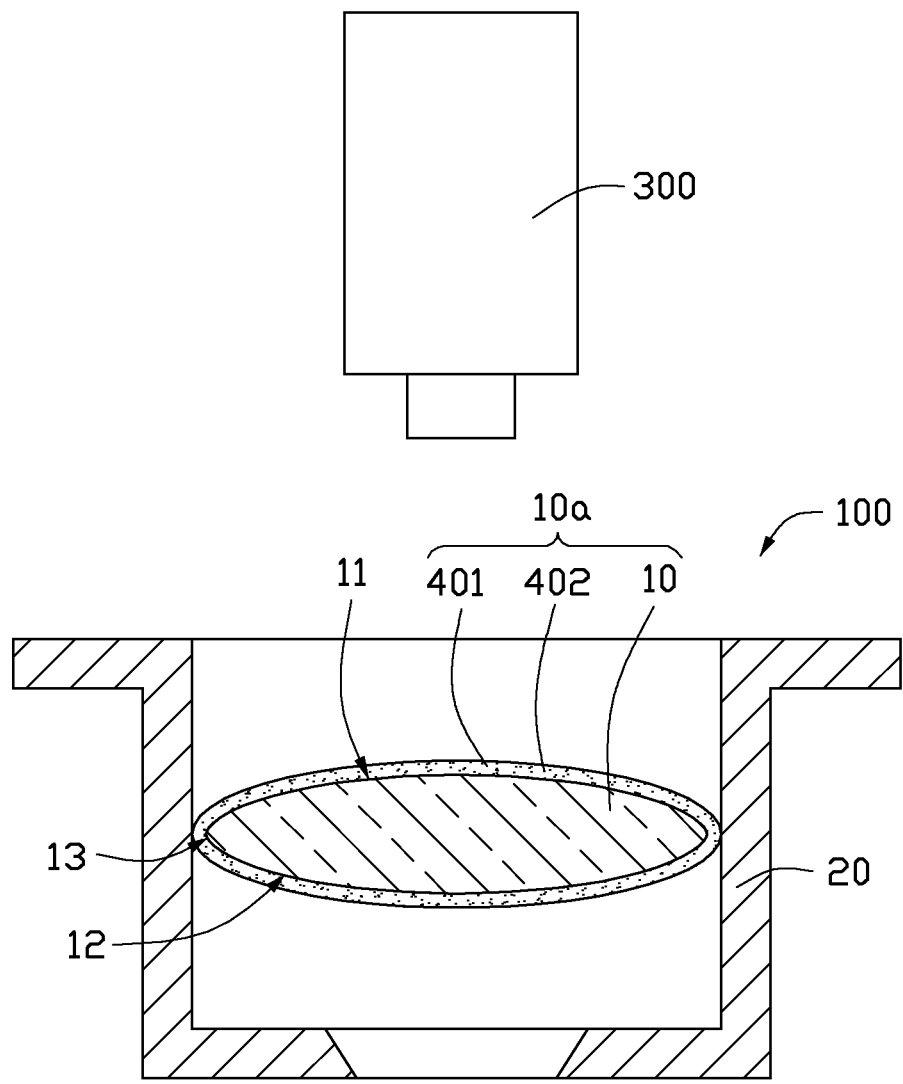
FIG. 3 is a schematic view of the lens module testing method of FIG. 1.

FIGS. 1-3 illustrate a lens module testing method in accordance with an exemplary embodiment. The lens module testing method includes the following steps.

In step 51: a lens module 100 is provided, and the lens module 100 includes a barrel 20 and a lens 10 received in the barrel 20. The lens 10 includes a first optical surface 11, a second optical surface 12, and a side surface 13. The second optical surface 12 is opposite to the first optical surface 11, and the side surface 13 connects the first optical surface 11 and the second optical surface 12. The first optical surface 11 faces an image side of the lens module 100, and the second optical surface 12 faces an object side of the lens module 100.

In step S2: the modulation transfer function (MTF) value of the lens module 100 is measured to determine whether the lens 10 is interferingly fit with the barrel 20. If the MTF value of the lens module 100 is in a predetermined range, the lens 10 is determined to be not interferingly fit with the barrel 20, then the lens module 100 can be used as a standard lens module to manufacture other lens modules. If the MTF value of the lens module 100 is not in a predetermined range, the lens 10 is determined to be interferingly fit with the barrel 20, then the method goes to step S3. A size of the lens 10 includes an outer diameter of the lens 10.

In step S3: the lens 10 is separated from the barrel 20, and a first coating layer 401 and a second coating layer 402 are formed on the lens 10 to obtain a coated lens 10a with a number of dots formed on the coated lens 10a. In this embodiment, an outer surface of the lens 10 is completely coated, and the outer surface includes the first optical surface 11, the second optical surface 12, and the side surface 13.

The first coating layer 401 completely covers the outer surface, and the second coating layer 402 includes a number of dots formed on the first coating layer 401. Shapes of the dots are different from each other, and sizes of the dots are different from each other. A color of the first coating layer 401 is different from a color of the second coating layer 402. In this embodiment, the color of the first coating layer 401 is white, and the color of the second coating layer 402 is black, and thus the dots are black dots. In other embodiments, only both of the first optical surface 11 and the side surface 13 are coated.

In step S4, a camera module 300 is provided, and the camera module 300 captures the coated lens 10a to obtain a first image.

In step S5, the coated lens 10a is placed in the barrel 20, and the camera module 300 captures the coated lens 10a to obtain a second image. The coated lens 10a is placed at a same position in the barrel 20 as the lens 10. In this embodiment, an optical axis of the camera module 300 is substantially coaxial with an optical axis of the lens 10 and the coated lens 10a.

In step S6, one dot is chosen from the dots randomly, and an actual moving distance of the chosen dot is determined using a 3D-Digital Image Correlation (3D-DIC) method according to the first image and the second image. The first image has a first dot image corresponding to the chosen dot, and the second image has a second dot image corresponding to the chosen dot. In particular, the actual moving distance is a moving distance from a position of the chosen dot when the lens 10 is separated from the barrel 20 to a position of the chosen dot when the lens 10 is assembled to the barrel 20. The 3D-DIC method is a well known technology and uses the first dot image and the second dot image to calculate.

In step S7, the size of the lens 10 is adjusted according to the actual moving distance of the chosen dot. In particular, outer diameter of the lens 10 is reduced by a value equal to the actual moving distance.

In step S8, the adjusted size of the lens 10 is displayed to a user.

The steps S1-S8 are repeated until the MTF value of the lens module 100 is in a predetermined range, and then the lens module 100 can be used as a standard lens module to manufacture other lens modules 100. The predetermined range of MTF value may be determined according to practical use.

An image of the lens 10 has a number of dot images corresponding to the dots respectively. Each dot image has a number of pixels. Each of the pixels has a gray level value. Because the shapes of the dots are different from each other, and the sizes of the dots are different from each other, the gray level distributions of the dot images are different from each other. When the coated lens 10a is interferingly fit with the barrel 20, the first coating layer 401 and the second coating layer 402 are squeezed, and thus the first coating layer 401 and the second coating layer 402 are deformed when the coated lens 10a is assembled to the barrel 20, but the gray level distribution of each dot image is changeless because the relative positions of the pixels of each dot image are changeless.

In particular, the step S6 further includes the following steps.

In step S61, the gray level distribution of the first dot image is measured.

In step S62, the second dot image is found according to the gray level distribution of the first dot image. The gray level distribution of the second dot image is substantially the same as the gray level distribution of the first dot image.

In step S63, an XY coordinate system is set randomly, and has an X-axis and a Y-axis. In this embodiment, a long edge of the first image is set as the X-axis, and the short edge of the first image is set as the Y-axis. According to the 3C-DIC method, a first coordinate (x1, y1) of the first dot image is determined, and a second coordinate (x2, y2) of the second dot image is determined, and thus a determined distance between the first dot image and the second dot image is substantially equal to $\sqrt{(x1-x2)^2+(y1-y2)^2}$.

In step S64, the actual moving distance of the chosen dot is determined through multiplying the determined distance by a factor. The factor is obtained as following. The camera module 300 captures an object of which a length along a predetermined direction is L1 to obtain a reference image. The reference image includes an object image corresponding to the object. The length of the object image along the predetermined direction is measured as L2, and then the factor is substantially equal to L1/L2.

By employing the testing method, the size of the lens can be determined to make sure the lens is not interferingly fit with the barrel, and thus the image quality of the lens module can be effectively improved.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module testing method, comprising:
   providing a lens module comprising a barrel and a lens received in the barrel;
   measuring whether a modulation transfer function value of the lens module is in a predetermined range;
   if not, separating the lens and the barrel, and forming a first coating layer and a second coating layer on the lens to obtain a coated lens, wherein a color of the first coating layer is different from a color of the second coating layer, the first coating layer completely covers the lens, the second coating layer includes a plurality of dots formed on the first coating layer, shapes of the dots are different from each other, and sizes of the dots are different from each other;
   capturing a first image of the coated lens using a camera module;
   placing the coated lens in the barrel to obtain the lens module, and capturing a second image of the coated lens placed in the barrel;
   randomly choosing one dot from the dots, and determining an actual moving distance of the chosen dot using a 3D-Digital image correlation method according to the first image and the second image;
   adjusting a size of the lens according to the actual moving distance of the random dot; and
   displaying the adjusted size of the lens to a user.

2. The lens module testing method of claim 1, wherein the coated lens is placed at a same position in the barrel as the lens.

3. The lens module testing method of claim 1, wherein an optical axis of the camera module is substantially coaxial with an optical axis of the coated lens.

4. The lens module testing method of claim 1, wherein the color of the first coating layer is white, and the color of the second coating layer is black.

5. The lens module testing method of claim 1, wherein the lens comprises a first optical surface and a side surface, the first optical surface faces an image side of the lens module, the side surface adjoins the first optical surface, the both of the first optical surface and the side surface are coated with the first coating layer and the second coating layer;
   the first coating layer is formed on the first optical surface and the second coating layer is formed on the side surface.

6. The lens module testing method of claim 1, wherein the size of the lens comprises an outer diameter of the lens.

7. The lens module testing method of claim 6, further comprising reducing the outer diameter by a value equal to the actual moving distance.

* * * * *